(12) United States Patent
Hafner et al.

(10) Patent No.: US 10,569,921 B2
(45) Date of Patent: Feb. 25, 2020

(54) LABELING UNIT AND METHOD FOR LABELING CONTAINERS

(71) Applicant: Krones AG, Neutraubling (DE)

(72) Inventors: Dieter Hafner, Neutraubling (DE); Stephan Rattenberger, Neutraubling (DE); Tobias Eichhammer, Neutraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 15/738,549

(22) PCT Filed: Jun. 15, 2016

(86) PCT No.: PCT/EP2016/063708
§ 371 (c)(1),
(2) Date: Dec. 20, 2017

(87) PCT Pub. No.: WO2017/016741
PCT Pub. Date: Feb. 2, 2017

(65) Prior Publication Data
US 2018/0186493 A1    Jul. 5, 2018

(30) Foreign Application Priority Data
Jul. 24, 2015    (DE) .......................... 10 2015 214 011

(51) Int. Cl.
*B65C 9/18*    (2006.01)
*B65C 9/22*    (2006.01)
(Continued)

(52) U.S. Cl.
CPC ............ *B65C 9/1819* (2013.01); *B29C 66/90* (2013.01); *B29C 66/92* (2013.01); *B65C 9/2265* (2013.01);
(Continued)

(58) Field of Classification Search
CPC ..... B65C 9/1819; B65C 9/2265; B29C 66/90; B29C 66/92; B29C 43/00; B29C 63/20; B32B 37/10
(Continued)

(56) References Cited

U.S. PATENT DOCUMENTS 2,545,292 A    3/1951    Magnusson
2,936,921 A    5/1960    Schulz
(Continued)

FOREIGN PATENT DOCUMENTS

DE    2055534 A1    6/1971
DE    2415919 A1    10/1974
(Continued)

OTHER PUBLICATIONS

English translation of Written Opinion of WO2017/016741.*
(Continued)

*Primary Examiner* — Sonya M Sengupta
(74) *Attorney, Agent, or Firm* — McCoy Russell LLP

(57) ABSTRACT

A labelling unit and a method for labelling containers is provided. Said method provides rapid and reliable switching movements with low noise development and low wear of the mechanical components in that suction bars for suctioning label areas at places where container gaps occur can be actively switched back to an inner position, in which they do not come into contact with a gluing unit, and in that the switching process is triggered with the aid of a stationary toggle lever.

15 Claims, 3 Drawing Sheets

(51) Int. Cl.
  *B29C 65/00* (2006.01)
  *B29C 63/20* (2006.01)
  *B32B 37/10* (2006.01)
  *B29C 43/00* (2006.01)

(52) U.S. Cl.
  CPC .............. *B29C 43/00* (2013.01); *B29C 63/20* (2013.01); *B32B 37/10* (2013.01)

(58) Field of Classification Search
  USPC ....... 156/242, 285, 295, 350, 362, 378, 391, 156/446
  See application file for complete search history.

(56) References Cited

U.S. PATENT DOCUMENTS

| | | |
|---|---|---|
| 3,864,187 A | 2/1975 | Carter |
| 3,867,233 A | 2/1975 | Eder et al. |
| 3,890,192 A | 6/1975 | Della Vite |
| 4,354,887 A | 10/1982 | Total |
| 4,632,721 A | 12/1986 | Hoffmann et al. |
| 4,922,775 A * | 5/1990 | Winter ................. B23D 19/065 83/100 |
| 5,024,717 A * | 6/1991 | Winter ................. B65C 9/1819 156/354 |

FOREIGN PATENT DOCUMENTS

| | | |
|---|---|---|
| DE | 202012003268 U1 | 5/2012 |
| DE | 102012200826 A1 | 7/2013 |
| EP | 0261861 B1 | 12/1990 |
| GB | 334500 A | 5/1960 |
| GB | 2072135 A | 9/1981 |

OTHER PUBLICATIONS

ISA European Patent Office, International Search Report Issued in Application No. PCT/EP2016/063708, dated Aug. 24, 2016, WIPO, 6 pages.

* cited by examiner

LABELING UNIT AND METHOD FOR LABELING CONTAINERS

CROSS-REFERENCE TO RELATED APPLICATIONS

The present application is a U.S. National Phase of international Patent Application Serial No. PCT/EP2016/063708 entitled "LABELLING UNIT AND METHOD FOR LABELLING CONTAINERS," filed on Jun. 15, 2016. International Patent Application Serial No. PCT/EP2016/063708 claims priority to German Patent Application No. 10 2015 214 011.3, filed on Jul. 24, 2015. The entire contents of each of the abovementioned applications are hereby incorporated by reference in their entirety for all purposes.

TECHNICAL FIELD

The invention relates to a labeling unit and a corresponding method for labeling containers.

BACKGROUND

For labeling containers, such as beverage bottles or the like, it is known, for example, from DE 20 2012 003 268 U1, to first separate sheet-shaped labels from a label strip in a cutting unit provided endlessly from a reel and to suction them at a continuously rotating vacuum transfer cylinder for subsequent transfer of the labels to containers and to apply glue to them during circulation. Switchable suction bars are formed on the vacuum transfer cylinder for the lateral front and end areas of the labels. They are selectively switchable from an outer working position, in which the suction bars guide a label area held by them against a gluing unit present in the periphery of the vacuum transfer cylinder, to an inner passing position in which they do not contact the gluing unit.

In particular in production systems in which the individual processing machines are formed to be mechanically firmly interconnected, position gaps inevitably occur in the incoming flow of containers due to errors upstream of the labeling machine. Since the vacuum transfer cylinder rotates continuously during operation, a position gap must also be generated in the flow of labels at the conveying position corresponding to the position gap of the flow of containers, in that the vacuum transfer cylinder is not provided with a label at the respective slot. Consequently, the empty suctions bars are exposed when passing the gluing unit and must be switched to the inner passing position to avoid glue being applied to the suction bars.

For switching the suction bars, preferably a stationary switching unit with displaceable operating cams, which interact with the control rollers coupled to the suction bars and switch them to the inner position, is present below the vacuum transfer cylinder. A roller mechanism for switching the operating cams is typically available In the switching unit. It needs to, firstly, switch rapidly and, secondly, transmit comparatively high switching forces. This causes loud switching noise and undesirable high wear of the switching mechanism.

Therefore, a need exists for a labeling unit which is improved in this respect and a labeling method which enables correspondingly improved machine operation when position gaps occur in the flow of containers.

SUMMARY

Accordingly, it comprises a vacuum transfer cylinder with suction bars for suctioning labels; a gluing unit formed in the region of the vacuum transfer cylinder for applying glue onto the labels; and a stationary switching unit having a movable operating cam for switching the suction bars to an inner position in which the suction bars pass the gluing unit without contacting it. According to the invention, the switching unit comprises a toggle lever for actuating the operating cam.

The outer position can be understood as being a proper working position of the suction bar. The suction bars are resiliently preloaded in the outer position, for example, against a stop. In the outer position, the suction bars guide the suctioned label areas against a glue roller present on the gluing unit.

The position radially inwardly thereto can be understood as being a passing position of the suction bars. Empty suction bars are temporarily switched to the passing position at least in the working region of the gluing unit. This shall hereafter also be referred to as switching back the suction bars.

The switching unit is stationary with respect to the rotational motion of the vacuum transfer cylinder. The toggle lever allows for both rapid switching movements and high switching forces at a comparatively low moving mass. This reduces both the noise and the wear during switching. The toggle lever transmits a switching force from a switching drive, for example, a pneumatic cylinder, to the operating cam or to a supporting structure connected thereto, for example, a carrier plate.

The switching unit is preferably configured such that the suction bars are switched back to the inner position by extending the toggle lever. This makes it possible to combine high actuating forces at the end of the extending movement with a comparatively rapid actuating movement at the beginning of the extending movement.

End-side mounting points of the toggle lever are preferably coupled to oppositely displaceable carriages, and the operating cam is connected to one of the end-side mounting points. The carriages are then displaceable preferably horizontally. The switching force acting upon a center mounting point of the toggle lever, in particular in the vertical direction, can then by way of linear guiding be efficiently transferred into a horizontal switching movement to the operating cam. In addition, the number of components to be moved during switching, and therefore the mass inertia of the stationary switching mechanism, can be minimized. This switching mechanism also exhibits high mechanical rigidity.

The operating cam is mounted preferably displaceably for actuation, for example, on a carrier plate. An extending movement of the toggle lever can then easily be transferred to the operating cam by way of linear guiding. In principle, however, a pivotable operating cam would also be conceivable. The operating cam is preferably movable in a horizontal plane.

Control rollers connected to the suction bars are preferably formed on the vacuum transfer cylinder in order to switch the suction bars to the inner position when they pass the operating cam. This allows for low-wear force transmission to the suction bars in order to switch them back to their inner position, in particular against a restoring force that forces them to the outer position.

An electrical or pneumatic switching drive connected to the toggle lever is preferably formed on the switching unit. It is connected, in particular, to a center mounting point of the toggle lever. This allows for rapid and low-wear operation of the toggle lever. The switching drive is then preferably a linear drive, for example, a pneumatic cylinder with a plunger, an electric linear motor or the like. The switching movement of the switching drive is preferably effected in the vertical direction.

The suction bars are preferably formed in pairs for a front area and an end area of the labels. An intermediate area of the labels disposed between the front area and the end area, though being suctioned at the vacuum transfer cylinder, is not applied glue. This simplifies the subsequent transfer of the labels to containers and saves glue, in particular for full circumferential labeling of the containers.

A first switching unit for the leading suction bars for suctioning the respective front areas and a second switching unit for trailing suction bars for suctioning the respective end areas are then preferably formed. This allows for selectively switching back individual bars and sufficiently long switching intervals, for example, between a trailing switching bar to be switched back and a subsequent leading switching bar, which is not to be switched back.

The labeling unit is preferably part of a labeling machine which further comprises a continuously rotatable labeling carousel for containers and a monitoring device formed upstream of the labeling unit for detecting position gaps between incoming containers. This allows for reliably switching back the suction bars.

Position gaps are understood to be gaps caused upstream in an otherwise continuous flow of containers, for example, by malfunctions or selective discharge of faulty containers. In particular, the turntables of the labeling carousel are not charged with a container at the position gaps, so that no labels can be transferred to containers at the position gaps. Such position gaps occur, in particular, with mechanically interconnected treatment units, such as a blow-molding machine, a filler and a labeler.

According thereto, labels are selectively transferred to a vacuum transfer cylinder, secured thereto by suction bars, and by the latter brought into contact with a gluing unit. Furthermore, suction bars that are not charged with labels are selectively switched back to an inner position in such a way that the suction bars pass the gluing unit without contacting it. According to the invention, an actuating force for switching back the suction bars is transmitted to the suction bars by way of a stationary mounted toggle lever.

The inflow of labels to the vacuum transfer cylinder is preferably interrupted in correspondence with a position gap in the flow of containers. As a result, selected suction bars are not charged with labels and a corresponding position gap in the inflow of labels is created at the vacuum transfer cylinder.

Switching the suction bars back preferably occurs during the continuous rotation of the vacuum transfer cylinder. This ensures high machine performance.

The suction bars are preferably switched back by extending the toggle lever against a spring force that returns the suction bars to an outer position. For this purpose, the suction bars are preloaded outwardly, for example, by pressure springs on the vacuum transfer cylinder and automatically return to their normal outer working position.

A stationarily mounted operating cam for switching back the suction bars is preferably moved by extending the toggle lever. This minimizes the mass to be moved during switching, maximizes the overall switching speed and the actuation force at the end of the switching movement.

Control rollers formed on the vacuum transfer cylinder preferably pass the operating cam when the suction bars are switched back. This simplifies the temporary switch-back in the region of the gluing unit.

Leading suction bars for suctioning a front area of the labels and trailing switching bars for suctioning an end area of the labels are switched back in pairs by way of separate operating cams.

An inflow of containers to be labeled is preferably also monitored for position gaps, and the suction bars are selectively switched back in response to position gaps thus detected. In this way, corresponding position gaps in the flow of labels can be reliably created.

The suction bars are preferably switched back in the region of a position gap between labels. This is synchronized, in particular, with a position gap between containers.

BRIEF DESCRIPTION OF THE FIGURES

A preferred embodiment of the invention is illustrated in the drawings, where.

DETAILED DESCRIPTION

Figure 1:
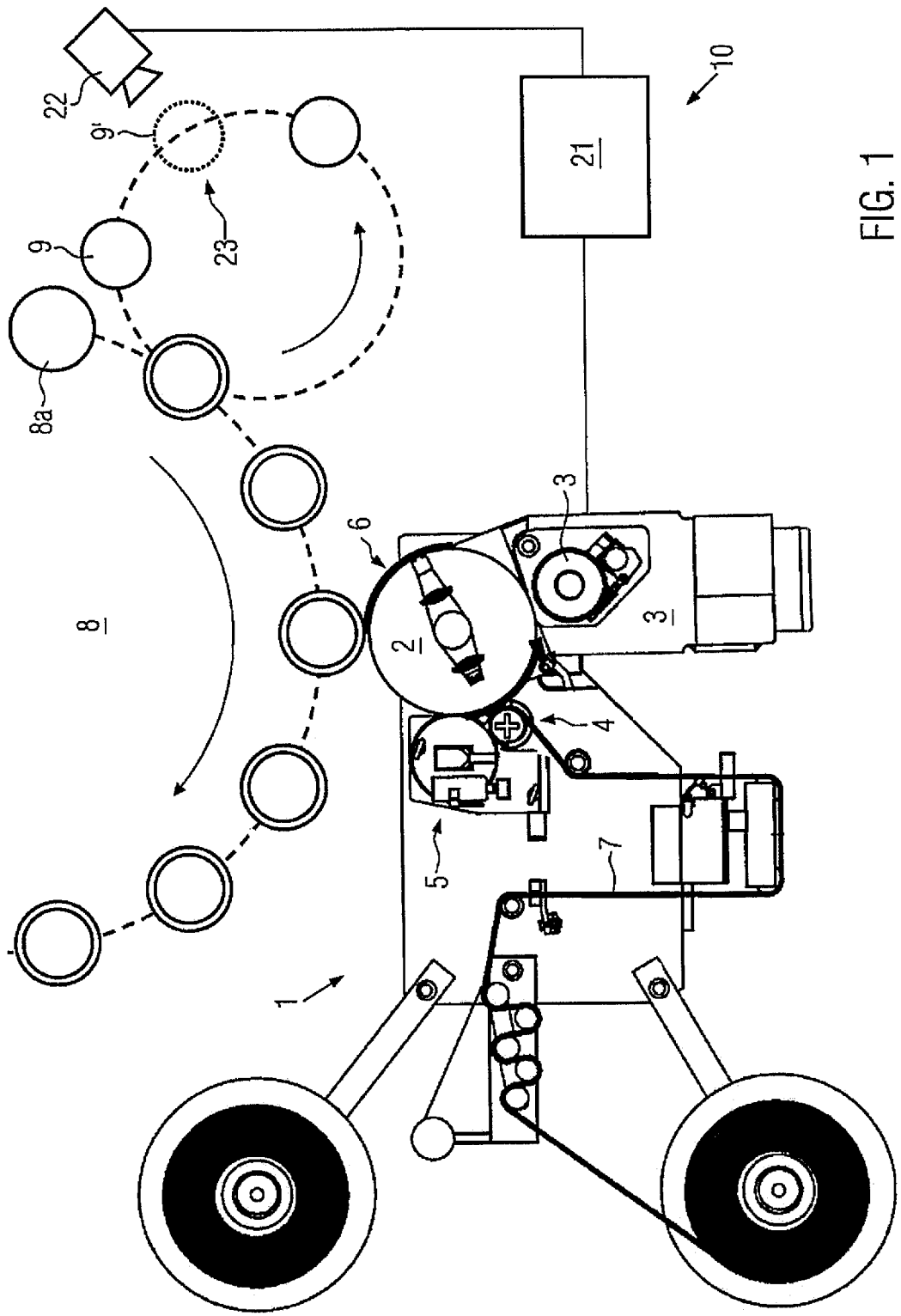
FIG. 1 shows a schematic top view of a labeling unit.

As can be seen from FIG. 1, labeling unit 1 in a preferred embodiment comprises a vacuum transfer cylinder 2 and a gluing unit 3 which is formed to be stationary in the periphery of vacuum transfer cylinder 2 Schematically indicated are further a conveying roller 4 and a cutting unit 5 with which labels 6 are separated from a label strip 7 provided endlessly from a reel in a known manner and transferred to vacuum transfer cylinder 2. Labels 6 are suctioned at vacuum transfer cylinder 2 in the manner described below and for continuous labeling are successively brought into contact with a glue roller 3a formed on gluing unit 3 for applying glue, Labels 6 with the glue applied are then transferred in the region of a continuously rotatable labeling carousel 8 in a manner known per se to containers 9 to be labeled.

Labeling unit 1 and labeling carousel 8 are part of a labeling machine 10 which is formed in a lateral body region, for example, for fully labeling containers 9 that are clamped in a centered manner on turntables 8a.

Figure 2:
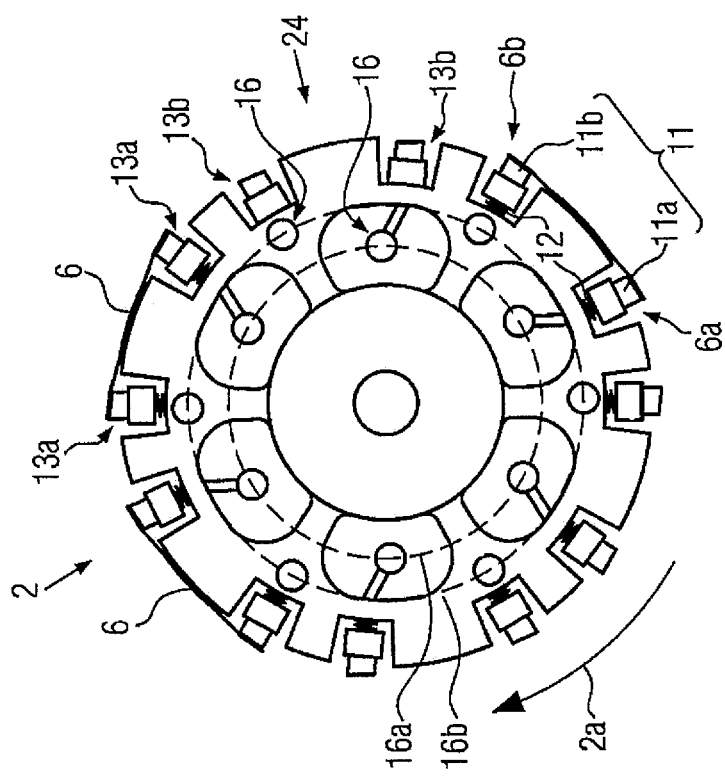
FIG. 2 shows a view of a vacuum transfer cylinder from below.

As can be seen from FIG. 2, vacuum transfer cylinder 2 comprises suction bars 11 which are formed, for example, in pairs in the form of leading suction bars 11a and trailing suction bars 11b for front and rear areas 6a, 6b of labels 6. All suction bars 11 are during normal labeling operation by way of compression springs 12 or the like [sic: held] in an outer position 13a in which suction bars 11 each guide held sections 6a, 6b toward glue roller 3a.

Suction bars 11 can be selectively switched back to an inner position 13b in which suction bars 11 each pass glue roller 3a without contacting it. At least one stationary switching unit 14 with an operating cam 15 that is displaceable thereon is formed for actively switching back suction bars 11.

The at least one operating cam 15 can be actuated, preferably by lateral displacement, so that control rollers 16 attached to vacuum transfer cylinder 2 perform a switching movement when passing operating cam 15, which they each transmit mechanically to a suction bar 11 drive-coupled thereto.

Figure 3:
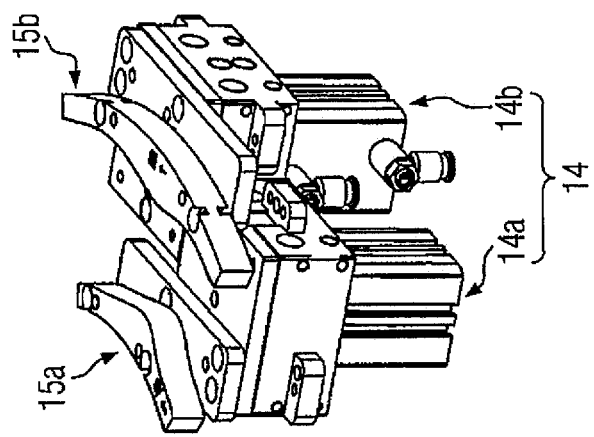
FIG. 3 shows an inclined view of two switching units.

As can be seen from FIG. 3, a first switching unit 14a is preferably formed with a first operating cam 15a for switching the leading suction bars 11a and a second switching unit 14b with a second operating cam 15b for switching trailing suction bars 11b. Control rollers 16 for leading suction bars 11a and control rollers 16 for trailing suction bars 11b preferably run along (schematically indicated) separate partial circles 16a, 16b.

Figure 4:
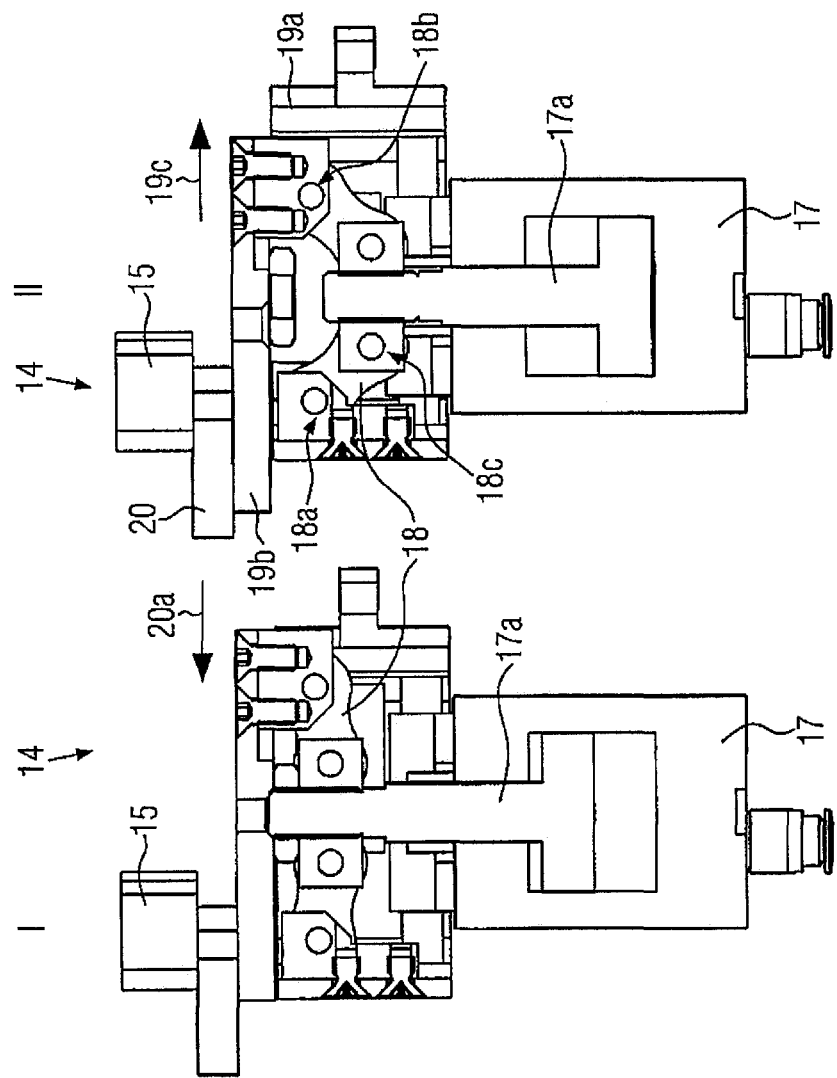
FIG. 4 shows a longitudinal sectional view through a switching unit in two switching positions.

As can be seen from FIG. 4, the at least one switching unit 14 preferably comprises an electromagnetic or hydraulic switching drive 17 and a toggle lever 18 driven by the latter and attached with its end side mounting points 18a, 18b to oppositely movable carriages 19a, 19b. A first carriage 19a is connected to a carrier plate 20 which is used for mounting operating cams 15. First carriage 19a performs a (schematically indicated) linear movement 20a together with carrier plate 20 when suction bar 11 is switched back. A second carriage 19b performs an oppositely directed linear movement 19c.

Both carriages 19a, 19b are linearly guided in a known manner in switching unit 14. In this way, the switching movement of end-side mounting point 18a is transmitted directly to carrier plate 20 and operating cam 15. This minimizes the mass to be moved during switching. In principle, however, it would also be conceivable to indirectly convert the switching movement of end-side mounting point 18a to a pivot movement of operating cam 15.

At position I, FIG. 4 illustrates that toggle lever 18 is extended to its inner position 13b when suction bars 11 are switched back. Accordingly, position II of FIG. 4 illustrates that toggle lever 18 is increasingly angled when suction bars 11 are switched forwardly to their outer position 13a. It then arises from the operating principle of the toggle lever that end-side mounting point 18a, and thus operating cam 15, first moves relatively rapidly when being switched back, and that the actuation force at end-side mounting point 18a increases with an increasingly extended toggle lever 18. Suction bars 11 can therefore be switched equally rapidly and reliably to inner position 13b against a spring force or the like that restores suction bars 11 to outer position 13a.

Switching drive 17 is preferably designed as a linear drive with a plunger 17a or the like which is drive-coupled to a center mounting point 18c of toggle lever 18. Switching drive 17 is then controlled by a (schematically indicated) control unit 21 for respectively actively extending or angling toggle lever 18. In principle, however, it would also be possible to couple the center mounting point 18c to an output shaft of the switching drive by way of a connecting rod or the like (not shown).

Control unit 21 is connected to a monitoring unit 22 that is formed upstream of vacuum transfer cylinder 2 and monitors the flow of containers and, upon the occurrence of position gaps 23 in the flow of containers (in FIG. 1 indicated by a missing container 9' illustrated by dots), transmits corresponding measurement or control signals to control unit 21. The latter in turn selectively creates corresponding position gaps 24 between labels 6 transported at vacuum transfer cylinder 2, for example, by actuating conveying roller 4 and cutting unit 5, and causes the at least one switching unit 14 to switch back suction bars 11 which are not charged with labels 6 at selective position gaps 24.

Labeling unit 1 can be operated, for example, as follows:
During normal labeling operation of labeling unit 1, label strip 7 is preferably fed continuously by way of conveying roller 4 to cutting unit 5 and separated therein to form labels 6. Labels 6 are transferred from cutting unit 5 to vacuum transfer cylinder 2 which rotates continuously in one direction 2a. Each label 6 is suctioned, preferably at its front end 6a and at its rear end 6b, by a leading suction bar 11a and a trailing suction bar 11b and at a respective intermediate area. Suction bars 11 are then in their normal outer position 12, so that the front and rear end areas 6a, 6b are each brought into contact with glue roller 3a and are in this manner coated with hot glue or the like.

The rotational speed of vacuum transfer cylinder 2 is synchronized in a manner known per se with the transport speed of containers 9 on continuously rotating labeling carousel 8, so that a respective label 6 is transferred to each container 9. Containers 9 are there rotated in an upright position on turntables 8a in a known manner and labels 6 are, in particular, fully circumferentially wound onto containers 9 and glued on with their end areas 6a, 6b where glue was applied.

The incoming flow of containers 9 is continuously examined with the aid of monitoring unit 22 with regard to the occurrence of position gaps 23, i.e. with regard to missing containers 9', for example, by way of optical scanning. If a position gap 23 is detected in the flow of containers, then monitoring unit 22 sends a suitable signal to control unit 21 which causes, for example, conveying roller 4 to interrupt the advancement of label strip 7. Consequently, cutting unit 5 can temporarily pass no label 6 to continuously rotating vacuum transfer cylinder 2. A position gap 24 in the flow of labels corresponding to position gap 23 in the flow of containers is thus created.

In order to prevent gluing unit 3 from applying glue to suction bars 11 that are not charged with a label 6 in the region of the corresponding position gap 24, the respective suction bars 11 are actively switched back to their inner position 13b by actuating switching units 14 while extending the toggle lever 18 and displacing operating cams 15 by way of control rollers 16 passing therealong.

Once control rollers 16 associated with position gap 24 have left the region of operating cams 15, and thus the working area of gluing unit 3, the switched back suction bars 11 automatically return to their outer position 13a by way of spring tension or the like.

At the end of position gap 24, operating cams 15 are switched with the aid of switching units 14 by angling toggle lever 18 such that control rollers 16 pass by without effect. Consequently, subsequent suction bars 11 remain in their normal working position, i.e. in outer position 13a, so that suctioned labels 6 are properly applied glued and transferred to containers 9.

The number of suction bars 11, switching units 14 and operating cams 15 described is by way of example and could be adapted to required machine performance, device dimensions or the like, without parting from the underlying switching principle by use of toggle lever 18.

Transporting label strip 7, separation it to form labels 6 and transporting and transferring those to rotating vacuum transfer cylinder 2 can be done in a known manner.

The invention claimed is:
1. A labeling unit, comprising:
a vacuum transfer cylinder with suction bars for suctioning labels;
a gluing unit formed adjacent to said vacuum transfer cylinder for applying glue onto said labels; and
a stationary switching unit having a movable operating cam for switching said suction bars to an inner position wherein said suction bars pass said gluing unit without contacting it,
wherein said stationary switching unit comprises a toggle lever for actuating said movable operating cam and a switching drive for angling the toggle lever, wherein the toggle lever includes a pair of end-side mounting points and a pair of center mounting points, a plane of the pair of end-side mounting points being parallel to a plane of the pair of center mounting points.

2. The labeling unit according to claim 1, where said stationary switching unit is configured such that it switches back said suction bars by moving said toggle lever to said inner position.

3. The labeling unit according to claim 1, where the end-side mounting points of said toggle lever are coupled to oppositely displaceable carriages and said movable operating cam is connected to one of said end-side mounting points.

4. The labeling unit according to claim 1, where said movable operating cam is displaceably mounted for actuation.

5. The labeling unit according to claim 1, where control rollers connected to said suction bars are formed on said vacuum transfer cylinder in order to switch said suction bars to the inner position when they pass said movable operating cam.

6. The labeling unit according to claim 1, where an electrical or pneumatic switching drive, connected to a center mounting point of said toggle lever, is formed on said stationary switching unit.

7. The labeling unit according to claim 1, where said suction bars are formed in pairs for a front area and an end area of said labels, the pairs including leading suction bars for suctioning said front area and trailing suction bars for suctioning said end area.

8. The labeling unit according to claim 7, further comprising a first switching unit for the leading suction bars for suctioning said front area and a second switching unit for the trailing suction bars for suctioning said end area are formed.

9. A labeling machine with said labeling unit according to claim 1, a continuously rotatable labeling carousel for containers, and a monitoring device formed upstream of said labeling unit for detecting position gaps between incoming containers.

10. A method for labeling containers, in which labels are transferred to a vacuum transfer cylinder, attached there by way of suction bars and by the suction bars brought into contact with a gluing unit, where suction bars selectively not being charged with labels are switched back to an inner position in such a manner that said suction bars pass said gluing unit without contacting it, wherein an actuating force for switching back said suction bars is transferred to said suction bars by way of a stationary mounted toggle lever that is angled by a switching drive, the toggle lever including a pair of end-side mounting points and a pair of center mounting points, a plane of the pair of end-side mounting points maintained parallel to a plane of the pair of center mounting points while the toggle lever is angled.

11. The method according to claim 10, where an inflow of said labels to said vacuum transfer cylinder is interrupted in correspondence with a position gap in an inflow of containers.

12. The method according to claim 10, where said suction bars are switched back during continuous rotation of said vacuum transfer cylinder.

13. The method according to claim 10, where said suction bars are switched back by moving said stationary mounted toggle lever against a spring force that returns said suction bars to an outer position.

14. The method according to claim 10, where the inflow of containers to be labeled is further monitored for position gaps, and said suction bars are selectively switched back in response to position gaps thus detected.

15. The method according to claim 10, where said suction bars are switched back in a region of a position gap between labels.

* * * * *